(12) United States Patent
Quesselaire

(10) Patent No.: US 7,971,788 B2
(45) Date of Patent: Jul. 5, 2011

(54) ELECTRONIC PAYMENT TERMINAL, SMART CARD ADAPTED TO SUCH A TERMINAL AND METHOD FOR LOADING A SECRET KEY IN SUCH A TERMINAL

(75) Inventor: Dominique Quesselaire, Cachan (FR)

(73) Assignee: Gemalto SA, Meudon Cedex (FR)

( * ) Notice: Subject to any disclaimer, the term of this patent is extended or adjusted under 35 U.S.C. 154(b) by 1497 days.

(21) Appl. No.: 10/479,647

(22) PCT Filed: May 27, 2002

(86) PCT No.: PCT/FR02/01766

§ 371 (c)(1),
(2), (4) Date: Dec. 1, 2003

(87) PCT Pub. No.: WO02/097747

PCT Pub. Date: Dec. 5, 2002

(65) Prior Publication Data

US 2004/0236693 A1 Nov. 25, 2004

(30) Foreign Application Priority Data

May 31, 2001 (FR) ...................... 01 07204

(51) Int. Cl.
*G06K 7/08* (2006.01)
(52) U.S. Cl. ...................... 235/451; 235/492
(58) Field of Classification Search ................ 235/451, 235/379, 492; 361/747
See application file for complete search history.

(56) References Cited

U.S. PATENT DOCUMENTS

| | | | | |
|---|---|---|---|---|
| 5,745,571 A | * | 4/1998 | Zuk | 380/285 |
| 5,756,978 A | * | 5/1998 | Soltesz et al. | 235/380 |
| 5,887,266 A | * | 3/1999 | Heinonen et al. | 455/558 |
| 6,097,606 A | * | 8/2000 | Groves et al. | 361/747 |
| 6,152,367 A | | 11/2000 | Kowalski | |
| 6,516,996 B1 | * | 2/2003 | Hippelainen | 235/379 |
| 2003/0163684 A1 | * | 8/2003 | Fransdonk | 713/153 |

FOREIGN PATENT DOCUMENTS

| | | |
|---|---|---|
| EP | 0587375 A2 | 3/1994 |
| EP | 0889450 A1 | 1/1999 |
| FR | 2759833 A1 | 8/1998 |
| JP | 63118873 A * | 5/1988 |
| WO | 9859327 A1 | 12/1998 |

OTHER PUBLICATIONS

International Search Report issued in PCT/FR02/01766; Dated: Oct. 15, 2002; (4 Pages).
Mechanical English Translation of EP0889450; Published Jan. 7, 1999 (3 Pages).
Mechanical English Translation of FR2759833; Published Aug. 21, 1998 (5 Pages).
"A chip card architecture for integrated retail systems", prepared for the Forum of the British Retail Consortium, Apr. 27, 1998 (22 pages).

* cited by examiner

*Primary Examiner* — Daniel A Hess
(74) *Attorney, Agent, or Firm* — Osha • Liang LLP

(57) ABSTRACT

The invention relates to a card reader payment terminal including an electrode circuit including at least one printed circuit board, to which are connected electronic components, particularly a microcontroller designed to control different peripherals characterized in that the microcontroller is connected to an associated microprocessor, the microcontroller using the associated microprocessor for performing programs such as arithmetic calculations, the microprocessor being mounted on a support having the format of a smart card and including a connector compatible with the standardized connector of the smart cards for connection with the microcontroller.

17 Claims, 3 Drawing Sheets

ELECTRONIC PAYMENT TERMINAL, SMART CARD ADAPTED TO SUCH A TERMINAL AND METHOD FOR LOADING A SECRET KEY IN SUCH A TERMINAL

FIELD OF THE INVENTION

This invention relates to a card reader electronic payment device that is also called a payment terminal. It further relates to a smart card designed to be integrated into the electronic circuit of the said terminal. This invention also covers a method for downloading confidential data into such a terminal.

BACKGROUND OF THE INVENTION

Today, there are many payment card reader terminals, most of which have an electronic circuit that manages the operating of the device, which is made up of a printed circuit board on which a number of electronic components are soldered, including microcontrollers.

Conventional payment devices with bankcard readers include terminals that are generally portable, wired or wireless, which operate alone or with a base.

The functions that are allocated to the base and the terminal may vary from one embodiment to the next. The base is generally connected to a payment centre via the public switched telephone network and transmits messages to bank servers in response to the messages received from the terminal. The base also acts as the recharging station for charging the electricity accumulator in the terminal. Besides, the base may also be used to print transaction tickets.

The portable terminal therefore includes at least one payment card reader, a data input keypad, a display screen, power supply, particularly in the form of a rechargeable accumulator and an electronic control circuit in the form of a printed circuit board that includes a main microcontroller comprising a micro-processor and different input and output interfaces. The main microcontroller is particularly responsible for the operating of the terminal and also that of the various peripheral devices.

Systems are also known where such portable devices are fitted with one or more miniature smart card readers that meet the requirements of standard GSM 11.11, which miniature smart cards are also commonly called SAM (Secure Access Module) cards. These SAM cards have an input/output pad that meets the requirements of standard ISO (Cnet) applicable to smart cards. Because such SAM cards are very small, they can be easily installed in portable electronic devices, particularly card reader payment terminals.

The use of such SAM cards in payment terminals is currently dedicated to the execution of specific tasks such as identification operations, password verification or managing electronic purse financial applications that use confidential data and proprietary algorithms that the managing organisations do not wish to publish and are therefore incorporated directly into the electronic circuit of the terminal.

These SAM cards used by portable terminals such as payment terminals or mobile phones therefore contain confidential information and are issued by operators (banks etc.) to fully identified users (merchants etc.), who are then required to insert them in the terminals to execute specific applications with the devices, such as debiting and crediting electronic purse cards.

Cards and terminals are therefore produced and developed totally separately. Terminals fitted with SAM card readers consider the SAM cards as peripheral devices and the microcontroller of the terminal is configured to converse with the cards in accordance with predetermined protocols and complete predefined tasks that are generally limited to transferring data or commands between the smart cards and the payment cards.

SUMMARY OF THE INVENTION

This invention is aimed at using the infrastructure of terminals with SAM card readers to modify the design of the electronic circuit of terminals.

According to the invention, the tasks that are generally completed by a single microprocessor in the terminal are distributed over several microprocessors operating in parallel, where at least one of the microprocessors is integrated into a support that meets the SAM card format, i.e. standard GSM 11.11. The aims, aspects and benefits of this invention will become easier to understand with the description given below of a mode of embodiment of the invention, described as a non-limitative example, with reference to the drawings attached, where:

To simplify the description, only those elements that are needed to understand the invention have been represented. Besides, the elements bear the same references from one figure to the next.

DETAILED DESCRIPTION OF THE INVENTION

Figure 1:
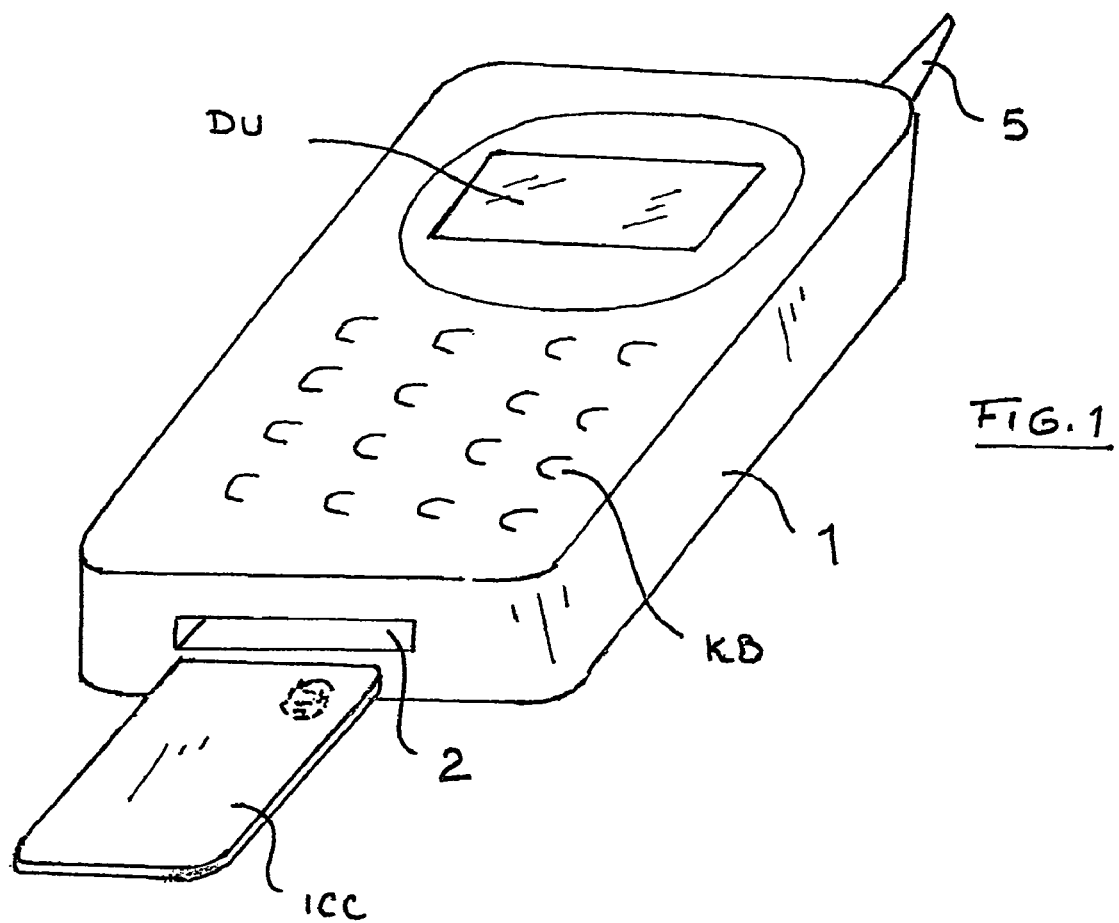
FIG. 1 is a schematic perspective view of a payment device in accordance with the invention.

FIG. 1 shows a bank card reader payment device. The device is made up of a portable terminal 1 with means to read payment cards, including both smart cards and/or magnetic stripe cards.

Portable terminal 1 is known to have at least one insertion slot 2 for inserting ICC payment cards with electronic chips, which slot works along with reading means that have not been represented. Terminal 1 also includes means (not illustrated) for reading cards with magnetic stripes. The terminal further includes a data input keypad KB and a display screen DU.

Terminal 1 also conventionally includes a power supply, in the form of a rechargeable accumulator, an electronic control circuit, in the form of a printed circuit board on which is connected at least one microcontroller and means to transmit and receive radio frequency messages along with antenna 5.

The above list of the equipment in terminal 1 is not limitative in this invention. Payment terminal 1 may also include means to print a transaction ticket. Likewise, the terminal may be wired and not include means to transmit and receive radio frequency messages. Similarly, the terminal may work along with a fixed base. Such a base could, for example, act as the battery charger, the printer if there is no printer on the terminal or the connection to the public switched telephone network. Whether it does so by means of a radio telecommunication network or through the public switched telephone network, the terminal needs to access bank servers to obtain authorisations and to transfer the financial transactions completed.

Figure 2:
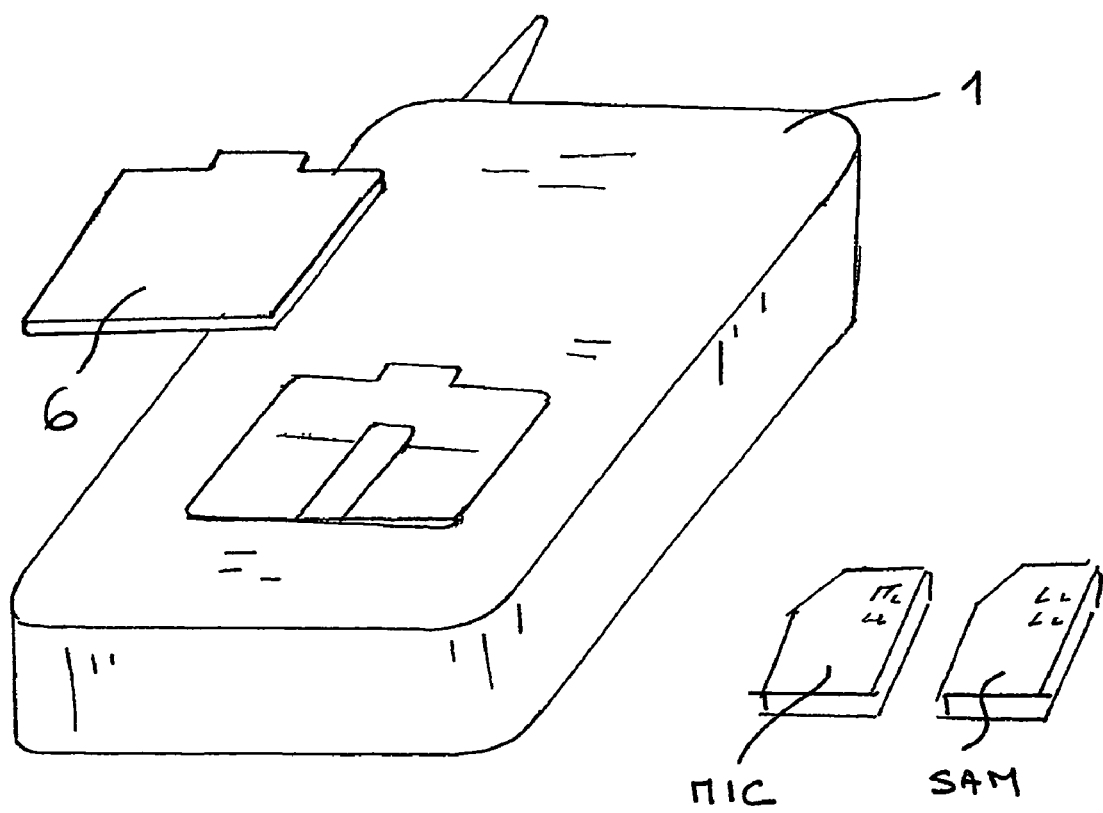
FIG. 2 is a schematic perspective view of the underside of the device represented in FIG. 1.

The underside of terminal 1 is represented in FIG. 2 and includes slots guarded by a removable cover 6 for plugging in miniature smart cards that meet the requirements of standard GSM 11.11, i.e. SAM smart cards.

Figure 3:
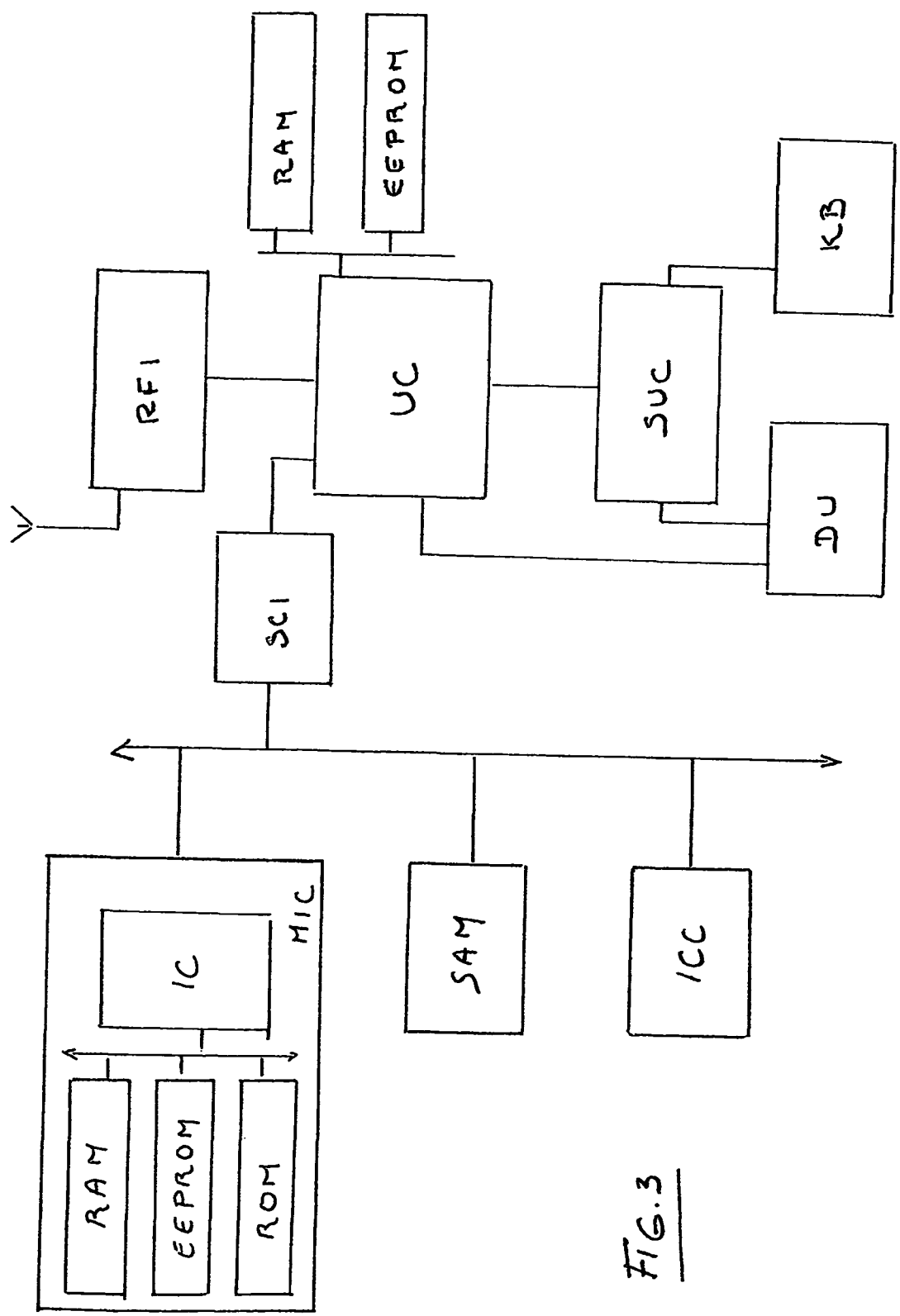
FIG. 3 is a block diagram of the electronic circuit fitted on payment devices in accordance with the invention.

With reference to FIG. 3, the electronic circuit of the terminal is schematically made up of a printed circuit board on which the electronic components required for the terminal to operate are soldered, particularly a main microcontroller UC, which may be a microcontroller developed specially for the terminal (ASIC). Microcontroller UC is associated with a non-volatile programme EEPROM memory and a RAM data memory and also input/output interfaces that are used by the various electronic components, particularly the radio frequency transmitter/receiver module RFI, the display screen DU and the keypad KB. Main microcontroller UC is also connected, through an appropriate interface SCI, to different smart card readers, one of which is connected to a micro smart card MIC, the role of which will be detailed below. The microcontroller can thus be connected by means of interface SCI, in addition to card MIC, to a SAM card and a ICC payment card. The integrated circuit board may also contain a secure microcontroller SUC to which are connected keypad KB and graphic display DU.

Secure microcontroller SUC is generally present when the terminal is required to read magnetic stripe cards and/or protect the confidentiality of the secret identification code, also called PIN code, which is entered by the user. The main functions of the secure microcontroller SUC in that case are to scramble the signals transmitted in order to keep the data entered on keypad KB from being detected by simply analysing the signals going into microcontroller UC. Secure microcontroller SUC also contains secret bank card keys and secret key encryption algorithms in order to securely transmit the PIN code through the telecommunication network to the bank servers, which have the same keys. When it is present, secure microcontroller SUC is directly connected to the main microcontroller through a communication bus.

The function of the SAM card that may be present in the terminal is to manage specific proprietary applications such as an electronic purse application. The electronic purse payment card is then directly debited or credited by means of the SAM card with special and secret algorithms and mechanisms that are the exclusive property of the organisation that manages the application. In that case, terminal 1 and particularly its electronic circuit have a merely transparent role, which is limited to exchanging data, particularly the commands prepared by the SAM card between the payment card, the keypad, the display and the SAM card.

Micro smart card MIC that defines an arithmetic coprocessor mainly includes a microprocessor IC, a ROM type memory with the card operating system, non-volatile memory of the EEPROM type and a RAM memory for processing data to be received from main microcontroller UC.

According to the invention, several software applications are loaded into the program memories of micro smart card MIC.

These applications incorporated into micro smart card MIC are designed to relieve main microcontroller UC for the implementation of algorithms that may require a large calculation capability, particularly during encryption and decryption, using RSA type algorithms.

One of the programs loaded in card MIC may be dedicated to calculations for authenticating the public key of the payment card when a public key authentication system of the PKI type (Public Key Infrastructure) of payment cards is in use.

Such systems are also known by the name DDA (Dynamic Data Authentication). The system is based on an encryption method of the asymmetrical type, such as for example the RSA algorithm, named after its inventors Rivest, Shamir and Adleman, based on modular exponentiation. The principle of such asymmetrical encryption methods is to have two keys for encryption and decryption. The decryption key cannot be inferred from the encryption key or vice versa. One key is made public (Public Key), whilst the other is kept confidential and is called the Private Key.

The DDA system therefore consists in using a single certification authority, payment card management organisations (Visa, MasterCard etc.) and banks or financial institutions that issue payment cards to end users. Each of these entities has an asymmetrical encryption algorithm, and therefore a Public Key, PCA, PI and PIC respectively and a Private Key, SCA, SI and SIC respectively. Each genuine payment card is given two authentication certificates, where public keys PI and PIC of the corresponding card management organisation and bank are certified with the private key SCA of the certifying authority and the private key of the card management organisation SI and the secret key of the issuing bank SIC.

In order to verify if a card inserted in a terminal is genuine, the terminal asks the card to submit the key PI certified by key SCA. The terminal has the key PCA for verifying the authenticity of the signature and inferring the authenticity of key PI. The terminal then asks for key PIC certified by key SI. As in the previous stage, the terminal has key PI and can verify the authenticity of the signature and infer that of key PIC.

The terminal then only needs to verify that the signature sent by the payment card in the form of a number N taken randomly and the certificate matches the number N encrypted with secret key SIC. The terminal has key PIC and can therefore determine the authenticity of the signature by decrypting the certificate and verifying that the result is indeed N.

The data supplied by payment card ICC to card MIC go through the microcontroller and card MIC takes charge of using the asymmetrical encryption algorithm for each of the aforementioned stages, which are therefore collected in a single processing operation.

Public key PCA is either introduced from the start in the card or introduced later on, e.g. by downloading.

In accordance with the invention, the performance of the aforementioned cascaded arithmetic calculations that are to be made by the terminal to authenticate an ICC payment card in accordance with the DDA method is transferred to card MIC. In that way, the calculations are optimised, particularly through the use of hard-wired logic integrated circuits that shorten calculation times.

Public key PCA and the algorithms used by the DDA method are freely communicated to the manufacturers of terminals and are therefore loaded in card MIC, preferably when it is manufactured or when terminal 1 is initialised.

Another possible application that is easy to implement is the encryption of the PIN code entered by the user and transmitted to the ICC smart card. For enhanced security, the PIN code should be transferred to the card in encrypted form and not in clear form. In this case, the PIN code goes through card MIC, which encrypts it with public key PIC and number N sent by the card during authentication and sends it on. Only the card that has N and secret key SIC can then infer the user's PIN code from the message received.

Another application that can be implemented easily is terminal customisation. For some applications, particularly for operating magnetic cards, the terminal must be given specific information such as the confidential codes required, particularly for secret key encryption operations of the DES (Data Encryption System) type. That is because before each transaction, magnetic cards require an online authorisation request that means that the secret PIN code of the user needs to be transmitted. The PIN code is encrypted by secure processor SUC containing secret key Ks supplied by the bank or the card management organisation. The PIN password entered by the user is encrypted by secret key Ks and transmitted by an appropriate telecommunications network to an authorisation server that also has key Ks and can find the PIN code of the user and issue the requested authorisation.

The loading of secret key Ks into secure processor SUC of terminal 1 is a long and complex operation, particularly because of the security requirements. The operation is generally performed by banks with specialised tools that are capable of loading data or programs into the secure microcontrollers SUC of terminals.

The downloading of key Ks can be made simpler by using smart card MIC. To that end, card MIC has an appropriate program. The progress of the program has been schematically described below. Card MIC is given a private key S1 and a public key P1 when it is designed. These keys may for instance be owned by the manufacturer of the terminal or of card MIC. Card MIC logs on to the appropriate bank server, which also has a private key P1 and a public key P2. Card MIC generates a random number M1 with appropriate means for generating random numbers. That number M1 is encrypted with public key P2 and sent in the encrypted form to the bank server. That server has key S2 for calculating number M1.

In its turn, the server generates number M2 and sends it in encrypted form with public key P1. Card MIC can then find M2 with the help of its secret key S1. The terminal—through card MIC—and the server are thus the only ones who know the combination of M1 and M2, which combination can then constitute a secret key TMK, which is sent to microcontroller SUC in encrypted form on the basis of a key known to card MIC and microcontroller SUC. The bank server can then securely transmit secret key Ks to microcontroller SUC by encrypting it with a DES algorithm and key TMK.

As a variant of embodiment, card MIC could encrypt number M1 with its private key S1 and the bank server could then decrypt M1 as it has public key P1. In this variant, no keys are needed for the authorisation.

As another variant of embodiment, an initial authentication stage could be added when the terminal logs on to the bank server for downloading the secret key.

That facility to remotely download secret keys in a fully reliable and secure fashion means that key Ks which is used by microcontroller SUC to transmit the PIN codes can be changed regularly for greater security.

The communication of the secret key based on M1 and M2 between card MIC and microprocessor SUC can be achieved by using key S1, which is first loaded into microprocessor SUC.

This invention relating to the use of at least one micro smart card MIC in combination with central microprocessor UC particularly relates to the implementation in a given terminal of additional calculation methods, which may be arithmetic or otherwise. These means incorporated into micro smart card MIC are particularly designed to reinforce the calculation capability of microcontroller UC of the printed circuit board of the terminal. These means are also adapted for customising the terminal as described above.

The use of a micro smart card MIC as a coprocessor associated with main microcontroller UC of the terminal offers several benefits, particularly improved performance as compared to terminals that only have a single microcontroller UC, as the number of iterations is greater. Also, it offers greater ease for upgrading terminal performance (changing micro smart card MIC is simpler than changing mother board UC). Besides, the overall security of the terminal is heightened, because the very design of smart cards makes them more difficult to break into, as compared to conventional electronic cards.

Of course, the mode of embodiment illustrated is only given as an example and is absolutely not limitative of all the solutions that can be implemented with the help of this invention.

In particular, card MIC could be rendered impossible to remove directly, by providing a slot inside the terminal housing, which is not accessible from the outside. Likewise, card MIC could be soldered onto the printed circuit board.

What is claimed is:

1. A card reader payment terminal comprising:
an electronic circuit including at least one printed circuit board, to which are connected electronic components, comprising:
a microcontroller designed to control different peripherals, wherein the microcontroller is connected to an associated microprocessor;
wherein the card reader payment terminal is configured to receive a smart card comprising the associated microprocessor, wherein the associated microprocessor comprises a connector compatible with the standardised connector of smart cards for connection with the microcontroller,
wherein the microcontroller and the associated microprocessor operate in parallel for executing a task,
wherein the associated microprocessor incorporates hardwired logic integrated circuits that are adapted for downloading at least one secret key.

2. The card reader payment terminal according to claim 1, wherein the smart card has a micro smart card format of SAM type and a connector compatible with the standardised connector of micro smart cards.

3. The card reader payment terminal according to claim 1, wherein the associated microprocessor incorporates hardwired logic integrated circuits that shorten the calculation times.

4. The card reader payment terminal according to claim 1, wherein the associated microprocessor is integrated into a micro smart card.

5. The card reader payment terminal according to claim 1, wherein the associated microprocessor is adapted to authenticate smart payment cards using PKI type systems with public and private keys(s).

6. The card reader payment terminal according to claim 5, wherein the associated microprocessor authenticates smart payment cards on the basis of public keys and dissymmetrical encryption algorithms of the known RSA type.

7. The card reader payment terminal according to claim 1, wherein the card reader payment terminal works along with means of telecommunication for accessing a remote authorisation server, and wherein the at least one secret key is used to encrypt communications between the card reader payment terminal and the remote authorisation server.

8. The card reader payment terminal according to claim 7, wherein the card reader payment terminal further comprises a secure microcontroller designed to encrypt numbers forming a secret code of a card user entered using an appropriate keypad of the card reader payment terminal, and wherein the secure microcontroller encrypts the secret code by means of a symmetrical encryption algorithm of the DES type using the secret key.

9. The card reader payment terminal according to claim 8, wherein the secure microcontroller and the associated microprocessor have a same internal secret key, wherein the internal secret key is used to exchange data encrypted using the symmetrical encryption algorithm of the DES type and the internal secret key.

10. The card reader payment terminal according to claim 7, wherein the secure microcontroller and the associated microprocessor are adapted to periodically download the at least one secret key.

11. A smart card designed to work along with a payment terminal comprising an electronic circuit including at least one printed circuit board, to which are connected electronic components, particularly a microcontroller designed to control different peripherals wherein the microcontroller is connected to an associated microprocessor, the microcontroller using the associated microprocessor for performing tasks, the associated microprocessor being mounted on a support having the format of the smart card and comprising a connector compatible with the standardised connector of smart cards for connection with the microcontroller, wherein the smart card comprises the associated microprocessor with hard-wired logic integrated circuits that are adapted for downloading secret keys.

12. A smart card designed to work along with a payment terminal comprising an electronic circuit including at least one printed circuit board, to which are connected electronic components, particularly a microcontroller designed to control different peripherals wherein the microcontroller is connected to an associated microprocessor, the microcontroller using the associated microprocessor for performing tasks, the microprocessor being mounted on a support having the format of the smart card and comprising a connector compatible with the standardised connector of smart cards for connection with the the microcontroller, wherein the smart card comprises the associated microprocessor with hard-wired logic integrated circuits that are adapted for authenticating smart payment cards on the basis of a PKI type system with public and private key(s).

13. The smart card according to claim 12, wherein the associated microprocessor authenticates smart payment cards on the basis of public keys and dissymmetrical encryption keys of a known RSA type.

14. A card reader payment terminal comprising:
an electronic circuit including at least one printed circuit board, to which are connected electronic components, comprising:
a microcontroller designed to control different peripherals, wherein the microcontroller is connected to an associated microprocessor,
wherein the card reader payment terminal is configured to receive a smart card comprising the associated microprocessor, wherein the associated microprocessor comprises a connector compatible with the standardized connector of smart cards for connection with the microcontroller,
wherein the microcontroller and the associated microprocessor operate in parallel for executing a task,
wherein the card reader payment terminal works along with a means of communication for accessing a remote authorization server,
wherein the associated microprocessor is configured to download a secret key, wherein the secret key is designed to encrypt communications between the card reader payment terminal and the remote authorization server,
wherein the secure microcontroller is configured to encrypt numbers forming a secret code of the smart card user, wherein the numbers are entered on a keypad of the card reader payment terminal, and wherein the secure microcontroller encrypts the numbers using the secret key, and
wherein the secure microcontroller and associated microprocessor exchange data using the secret key.

15. A card reader payment terminal comprising:
an electronic circuit including at least one printed circuit board, to which are connected electronic components, comprising:
a microcontroller designed to control different peripherals wherein the microcontroller is connected to an associated microprocessor;
wherein the card reader payment terminal is configured to receive a smart card comprising the associated microprocessor, wherein the microcontroller and the associated microprocessor operate in parallel for executing a task, and
wherein the associated microprocessor incorporates hard-wired logic integrated circuits for:
downloading at least one secret key; and calculating a security operation.

16. The card reader payment terminal of claim 15, wherein the security operation is an authentication of a payment card.

17. A card reader payment terminal comprising:
an electronic circuit including at least one printed circuit board, to which are connected electronic components, comprising:
a secure microcontroller designed to control different peripherals, wherein the secure microcontroller is connected to an associated microprocessor;
wherein the card reader payment terminal is configured to receive a smart card comprising the associated microprocessor, wherein the associated microprocessor comprises a connector compatible with the standardized connector of smart cards for connection with the secure microcontroller,
wherein the secure microcontroller and the associated microprocessor operate in parallel for executing a task,
wherein the card reader payment terminal works along with a means of communication for accessing a remote authorization server,
wherein the associated microprocessor is configured to download a secret key, wherein the secret key is designed to encrypt communications between the card reader payment terminal and the remote authorization server,
wherein the secure microcontroller is configured to encrypt numbers forming a secret code of the smart card user, wherein the numbers are entered on a keypad of the card reader payment terminal, and wherein the secure microcontroller encrypts the numbers using a symmetrical encryption algorithm of DES type and the secret key, and
wherein the secure microcontroller and the associated microprocessor both use the secret key, and wherein the secure microcontroller and associated microprocessor exchange data encrypted with the symmetrical encryption algorithm using the secret key.

* * * * *